(12) United States Patent
Nishimura

(10) Patent No.: US 9,362,790 B2
(45) Date of Patent: Jun. 7, 2016

(54) PERMANENT MAGNET EMBEDDED ROTOR

(75) Inventor: Masashi Nishimura, Yamaguchi (JP)

(73) Assignees: Hiroyuki Nishimura, Yamaguchi (JP); Masashi Nishimura, Yamaguchi (JP)

( * ) Notice: Subject to any disclaimer, the term of this patent is extended or adjusted under 35 U.S.C. 154(b) by 317 days.

(21) Appl. No.: 13/696,264

(22) PCT Filed: Mar. 31, 2011

(86) PCT No.: PCT/JP2011/058236
§ 371 (c)(1),
(2), (4) Date: Nov. 5, 2012

(87) PCT Pub. No.: WO2011/142188
PCT Pub. Date: Nov. 17, 2011

(65) Prior Publication Data
US 2013/0049511 A1 Feb. 28, 2013

(30) Foreign Application Priority Data

May 13, 2010 (JP) .................................. 2010-111429

(51) Int. Cl.
| | | |
|---|---|---|
| H02K 21/12 | (2006.01) | |
| H02K 21/14 | (2006.01) | |
| H02K 21/28 | (2006.01) | |
| H02K 1/28 | (2006.01) | |
| H02K 1/27 | (2006.01) | |
| H02K 1/30 | (2006.01) | |

(52) U.S. Cl.
CPC .................. *H02K 1/278* (2013.01); *H02K 1/27* (2013.01); *H02K 1/2753* (2013.01); *H02K 1/28* (2013.01); *H02K 1/30* (2013.01); H02K 21/12 (2013.01); H02K 21/14 (2013.01); H02K 21/28 (2013.01)

(58) Field of Classification Search
CPC ............. H02K 1/27; H02K 1/28; H02K 1/30; H02K 1/278; H02K 1/2753; H02K 21/12; H02K 21/14; H02K 21/28
USPC ............. 310/156.28, 156.29, 156.53, 156.55, 310/156.56, 156.01, 156.23
IPC .................................. H02K 1/28, 21/12, 21/14
See application file for complete search history.

(56) References Cited

U.S. PATENT DOCUMENTS

| | | | | | |
|---|---|---|---|---|---|
| 3,849,682 | A | * | 11/1974 | Binns ........................ | 310/156.69 |
| 4,127,786 | A | * | 11/1978 | Volkrodt .................. | 310/156.84 |
| 4,302,693 | A | * | 11/1981 | Burgmeier ............. | H02K 1/278 |
| | | | | | 310/156.59 |

(Continued)

FOREIGN PATENT DOCUMENTS

| | | |
|---|---|---|
| JP | UM33-5716 | 4/1958 |
| JP | S57-186967 | 11/1982 |

(Continued)

*Primary Examiner* — John K Kim
(74) *Attorney, Agent, or Firm* — Muramatsu & Associates

(57) ABSTRACT

A permanent magnet embedded rotor disposed coaxially with a cylindrical stator having a plurality of coils in the circumferential direction includes a rotor core that includes a columnar body made of a magnetic metal and a spacer made of a nonmagnetic material, and has an even number of insertion grooves, a cylindrical body that is made of a nonmagnetic metal with good electrical conductivity and externally inserted on the rotor core, permanent magnets embedded in the insertion grooves so that their N poles and S poles alternately come into contact with the inner peripheral surface of the cylindrical body, and a rotary shaft made of stainless steel fit into a rotation center of the rotor core.

1 Claim, 5 Drawing Sheets

(56) References Cited

U.S. PATENT DOCUMENTS

| | | | | |
|---|---|---|---|---|
| 4,332,079 | A | * | 6/1982 | Silver ............... H02K 1/278 29/598 |
| 4,336,649 | A | * | 6/1982 | Glaser ............. H02K 1/2773 29/598 |
| 4,339,874 | A | * | 7/1982 | Mc'Carty ........... H02K 1/278 29/598 |
| 4,486,678 | A | * | 12/1984 | Olson ..................... 310/156.28 |
| 4,543,506 | A | * | 9/1985 | Kawada ............ H02K 1/2773 310/156.22 |
| 4,625,135 | A | | 11/1986 | Kasabian |
| 5,463,262 | A | * | 10/1995 | Uchida ............. H02K 1/2773 310/156.55 |
| 6,437,474 | B1 | * | 8/2002 | Chu ................. H02K 1/2773 29/598 |
| 6,765,319 | B1 | * | 7/2004 | Thompson .................. 310/43 |
| 7,834,505 | B2 | * | 11/2010 | Lee ........................ 310/156.53 |
| 8,610,324 | B2 | * | 12/2013 | Grann ............... H02K 49/106 310/103 |
| 2004/0140725 | A1 | * | 7/2004 | Takahashi ......... H02K 1/2786 310/156.21 |
| 2004/0212266 | A1 | * | 10/2004 | Hans ................ H02K 1/2766 310/156.56 |
| 2006/0290218 | A1 | | 12/2006 | Shafer et al. |
| 2008/0012434 | A1 | * | 1/2008 | Jiang ................... H02K 1/30 310/43 |
| 2009/0261678 | A1 | | 10/2009 | Sortore et al. |
| 2012/0326548 | A1 | * | 12/2012 | Nonaka ............. H02K 1/2773 310/156.19 |
| 2013/0049511 | A1 | * | 2/2013 | Nishimura ......... H02K 1/278 310/156.28 |

FOREIGN PATENT DOCUMENTS

| | | |
|---|---|---|
| JP | 63-023543 | 1/1988 |
| JP | H10-225032 | 8/1998 |
| JP | H11-098729 | 4/1999 |
| JP | 2002-218683 | 8/2002 |
| JP | 2005-045984 | 2/2005 |
| JP | 2009-124925 | 6/2009 |
| JP | 2010-094001 | 4/2010 |
| WO | WO 2012/118787 | 9/2012 |

* cited by examiner (a)

(b)

(a)

(b)

(a)

(b)

(a)

(b)

PERMANENT MAGNET EMBEDDED ROTOR

This application is a national stage of International Application No. PCT/JP2011/058236 filed Mar. 31, 2011, which claims the benefit of foreign filing based on Japanese Patent Application No. 2010-111429 filed May 13, 2010, the entire contents of which are incorporated herein by reference.

TECHNICAL FIELD

The present invention relates to a permanent magnet embedded rotor to be used in a rotary electric machine such as a motor and an electric generator, and specifically, to a permanent magnet embedded rotor to be used in a synchronous rotary electromotor that rotates a rotor by interaction of a rotating magnetic field generated by supplying an electric current to a stator and permanent magnets embedded in the rotor.

BACKGROUND ART

A basket-type induction motor is simple and strong, so that it is highly reliable and conventionally most commonly used in industry. However, in recent years, a synchronous motor using permanent magnets that has high efficiency and obtains high torque has attracted attention from the viewpoint of energy savings. A synchronous rotary electromotor which is a type of synchronous motor or a synchronous generator is structured to generate a rotating magnetic field by supplying an electric current to the coils of a stator, and rotate a rotor by applying this rotating magnetic field to a fixed magnetic field of the rotor. There are an SPM motor (Surface Permanent Magnet Motor) including permanent magnets attached to the outer peripheral surface of a rotor and an IPM motor (Interior Permanent Magnet Motor) including permanent magnets embedded in a rotor. Not only for such synchronous motors but also for all synchronous rotary electric machines including synchronous generators, a structure of a rotor capable of reducing an eddy current loss, reducing heat generation, and improving the rotation efficiency, has been studied and developed. Some inventions and devices relating to this have already been disclosed.

For example, Japanese Application Laid-Open Publication No. H11-98729 discloses an invention relating to a structure of a rotor capable of reducing an eddy current loss and improving an output of an electric motor, titled "Rotor structure of synchronous motor."

The invention disclosed in the Publication No. H11-98728 noted above provides a structure in which more magnets than the number of magnetic poles are disposed on the outer peripheral portion of a rotor core in a state where the magnets are insulated from each other.

An eddy current loss is in proportion to the size of the magnets, so that with this structure, an eddy current loss that occurs in the magnets can be reduced. Accordingly, the output of the electric motor is improved.

Japanese Application Laid-Open Publication No. H10-225032 discloses an invention relating to a rotor of a permanent magnet type rotary electromotor including a shrink ring whose eddy current loss is extremely small, titled "Rotor of permanent magnet type rotary electromotor and manufacturing method for the same."

The rotor that is the invention disclosed in the Publication No. H10-225032 noted above is structured so that, on the outer circumference of a wedge-shaped rotary shaft whose center portion is inclined in the axial direction, spacers and permanent magnets that are inclined in the same manner are disposed, and onto the outer side of these, a shrink ring that is also inclined and made of fiber reinforced plastic is fit.

The electrical conductivity of the fiber reinforced plastic is lower than that of stainless steel, so that with this structure, an eddy current loss can be made smaller than in the case of using a shrink ring made of stainless steel.

However, in the conventional technology described in the Publication No. H11-98728 noted above, although the eddy current loss occurring in the magnets can be reduced, the attaching area of the magnets to the rotor core is small, so that the magnets easily fly due to a centrifugal force when they rotate at a high speed.

In the conventional technology described in the Publication No. H10-225032 noted above, magnets and spacers must be processed into complicated shapes, so that the manufacturing cost is high.

The present invention was made in view of the conventional circumstances, and an object thereof is to provide a permanent magnet embedded rotor capable of improving rotation efficiency by reducing an eddy current loss, and being manufactured inexpensively.

Means for Solving the Problem

In order to achieve the above-described object, according to a first aspect of the present invention, a permanent magnet embedded rotor to be used in a synchronous rotary electromotor, includes a rotor core including a columnar body made of a magnetic metal and a spacer, a cylindrical body that is externally provided around the rotor core and made of a nonmagnetic metal with good electrical conductivity, permanent magnets embedded in the rotor core so that one ends of the magnetic poles come into contact with the inner peripheral surface of the cylindrical body and the other ends of the magnetic poles come into contact with the columnar body, and a rotary shaft fit into a rotation center of the rotor core. The permanent magnets are disposed so that their N poles and S poles alternately come into contact with the inner peripheral surface as viewed in the circumferential direction of the cylindrical body, and the cylindrical body is made of gold, silver, copper, or aluminum, or an alloy of at least two kinds of material selected from among them.

In this structure, magnetic poles of permanent magnets adjacent to each other are magnetically connected to each other via the columnar body, and between these, a magnetic path is easily formed. Accordingly, flux leakage is greatly reduced, and heat generation decreases. In addition, when assembled with a stator, magnetic paths formed between the magnetic poles of the stator and the magnetic poles of the permanent magnets are not blocked by the cylindrical body, so that strong magnetic paths are formed between the magnetic poles of the permanent magnets and the magnetic poles of the stator. Further, when the rotation of the permanent magnet embedded rotor is slower than the rotation speed of the rotating magnetic field produced by the stator, the cylindrical body made of a nonmagnetic metal crosses the magnetic flux passing between the poles of the stator and the permanent magnet, so that a force based on Fleming's rules are applied to the cylindrical body. Accordingly, the cylindrical body is pulled by the rotating magnetic field, and as a result, the permanent magnet embedded rotor fully rotates. In addition, for example, an eddy current loss is less than that arises in the case of using stainless steel for the cylindrical body.

According to a second aspect of the present invention, in the permanent magnet embedded rotor according to the first aspect, the spacer is made of a nonmagnetic material.

In the permanent magnet embedded rotor having this structure, a magnetic path through which a magnetic flux from the N pole of the permanent magnet in contact with the columnar body directly returns to the S pole is hardly formed, so that the effect of the first aspect of the invention in which the magnetic poles of the permanent magnets are magnetically connected to each other by the columnar body is more effectively exerted. Further, due to the spacer made of a nonmagnetic material, the magnetic poles of the permanent magnets on the side in contact with the cylindrical body are not close to each other, and thus are not magnetically connected to each other. Therefore, the saliency increases.

According to a fourth aspect of the present invention, in the permanent magnet embedded rotor according to the first or second aspect, the rotary shaft is made of stainless steel.

In the permanent magnet embedded rotor having this structure, a magnetic path from the magnetic pole of the permanent magnet to the rotary shaft through the columnar body is hardly formed.

According to a fifth aspect of the present invention, in the permanent magnet embedded rotor according to any one of the first, second and fourth aspects, one pair of permanent magnets adjacent to each other are set as first permanent magnets, and the permanent magnet embedded rotor includes second permanent magnets having rectangular shapes in a plan view and attached to the rotor core so that end portions having magnetic poles reverse to the magnetic poles on the columnar body side of the first permanent magnets are close to the magnetic poles of the first permanent magnet, respectively.

In the permanent magnet embedded rotor having this structure, by the second permanent magnets, between the magnetic poles on the sides in contact with the columnar body of the first permanent magnets, magnetic paths stronger than that in the first aspect are formed.

Effects of the Invention

With the permanent magnet embedded rotor according to the first aspect of the present invention, by increasing the adsorption power of the rotating magnetic field, a strong rotation torque can be generated. Further, a large clearance can be secured between the stator and the rotor. Therefore, even when the rotor thermally expands due to high-speed rotation or long driving and, as a result, the clearance changes, a failure due to contact, etc., between the rotor and the stator hardly occurs. In addition, synchronism loss hardly occurs, so that the rotation efficiency is improved. Even when the rotor does not synchronize with the rotating magnetic field, a rotation torque can be generated and the rotating state can be maintained. Further, the manufacturing cost can be reduced. In addition, an eddy current loss is reduced and heat generation can be reduced.

With the permanent magnet embedded rotor according to the second aspect of the present invention, the saliency increases, so that the adsorption power of the rotating magnetic field can be made stronger than that in the first aspect of the present invention, and a strong rotation torque can be generated.

With the permanent magnet embedded rotor according to the fourth aspect of the present invention, by reducing the flux leakage and forming strong magnetic paths between the magnetic poles of the permanent magnets and the magnetic poles of the stator, the adsorption power of the rotating magnetic field can be increased and a strong rotation torque can be generated.

The permanent magnet embedded rotor according to the fifth aspect of the present invention is more compact and higher in efficiency than in the first aspect of the invention, and can generate a strong rotation torque.

BEST MODE FOR CARRYING OUT THE INVENTION

Figure 1:
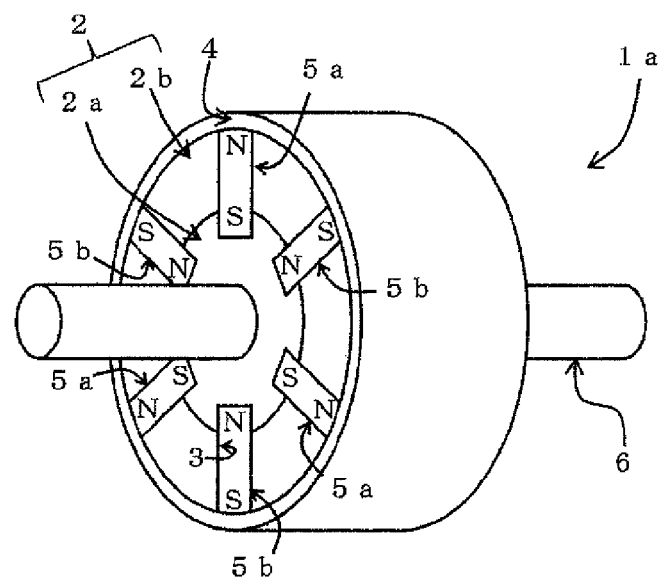
FIG. 1(a) and FIG. 1(b) are an external perspective view and a plan view of Example 1 of a permanent magnet embedded rotor according to an embodiment of the present invention.
Figure 1:
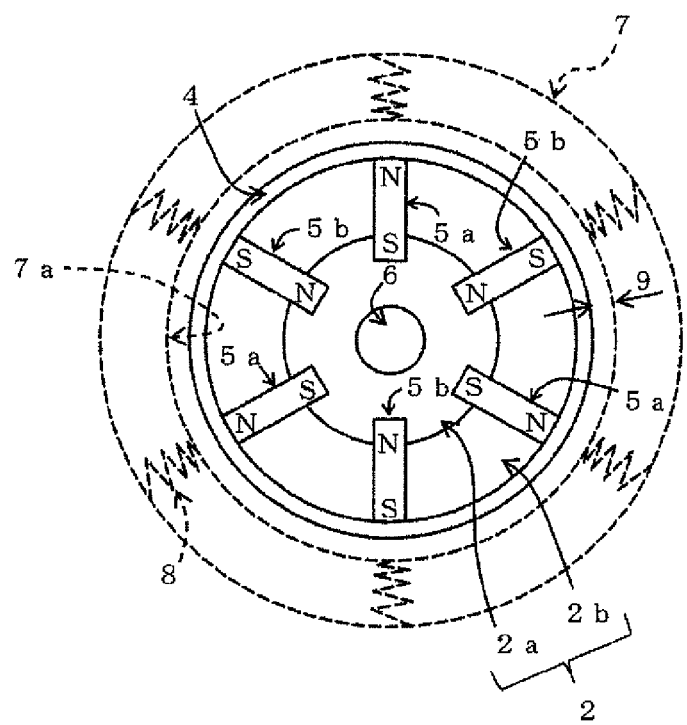

A permanent magnet embedded rotor according to the present invention can be used in both of a synchronous motor and a synchronous generator. Accordingly, hereinafter, without especially limiting the kind of the rotary electromotor, its structure, operation and effect will be described.

Example 1

A permanent magnet embedded rotor of Example 1 is described with reference to FIG. 1 to FIG. 4

FIG. 1(a) and FIG. 1(b) are an external perspective view and a plan view of Example 1 of a permanent magnet embedded rotor according to an embodiment of the present invention. FIG. 2(a) and FIG. 2(b) are plan views showing the permanent magnet embedded rotor of the present example and a modification thereof. In FIG. 1(b), a stator is schematically shown by dashed lines.

As shown in FIG. 1(a), the permanent magnet embedded rotor (hereinafter, referred to as rotor 1a) of the present example includes a rotor core 2 on which an even number of insertion grooves 3 each being formed substantially in a narrow and long rectangular shape while an outer peripheral side thereof is slightly curved. The insertion groove includes two parallel planes running from the outer peripheral surface toward the rotation center in a plan view, a cylindrical body 4 that is made of a nonmagnetic metal with good electrical conductivity such as gold, silver, copper or aluminum or an alloy of at least two kinds selected among these, and is externally provided around the rotor core 2, permanent magnets 5a and 5b embedded in the insertion grooves 3 so that their N poles and S poles alternately come into contact with the inner peripheral surface of the cylindrical body 4, and a rotary shaft 6 made of stainless steel that is fit in the rotation center of the rotor core 2. The rotor core 2 includes a columnar body 2a that has an outer peripheral surface on which portions of the insertion grooves 3 are formed and is made of a magnetic metal such as a magnetic steel sheet, and a spacer 2b made of a nonmagnetic material such as synthetic resin, aluminum, or ceramic. The depths of the insertion grooves 3 are less than the halves of the lengths of the permanent magnets 5a and 5b. The rotor 1a is disposed coaxially with a cylindrical stator 7 that includes a plurality of coils 8 in the circumferential direction as shown in FIG. 1(b) and generates a rotating magnetic field by changing a voltage to be applied to the coils 8 so that a predetermined clearance 9 is formed from the inner peripheral surface 7a.

Figure 2:
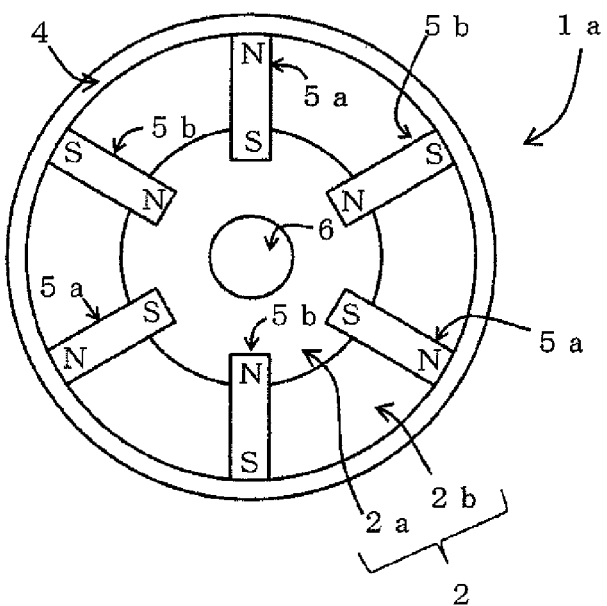
FIG. 2(a) and FIG. 2(b) are plan views showing the permanent magnet embedded rotor of Example 1 and a modification thereof.
Figure 2:
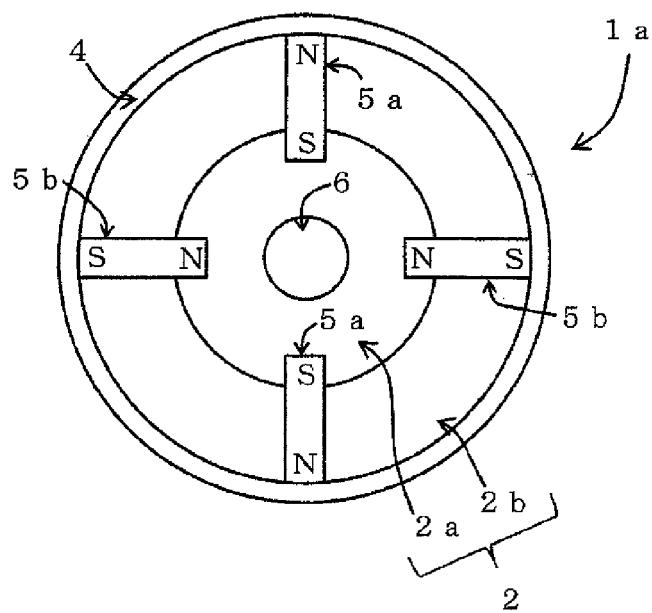

In the present example, as shown in FIG. 2(a), the rotor 1a includes six permanent magnets 5a and 5b, however, this is not limited. Specifically, the number of permanent magnets 5a and 5b may be set to 4 as shown in FIG. 2(b), or may be set to 2 or 8. However, as described later, to form an appropriate magnetic circuit, the number of permanent magnets 5a and 5b must be set to at least an even number. Further, unlike the case shown in FIG. 1 and FIG. 2, a structure in which the N poles of the permanent magnets 5a and the S poles of the permanent magnets 5b are brought into contact with the inner peripheral surface of the cylindrical body 4 is also possible.

Figure 3:
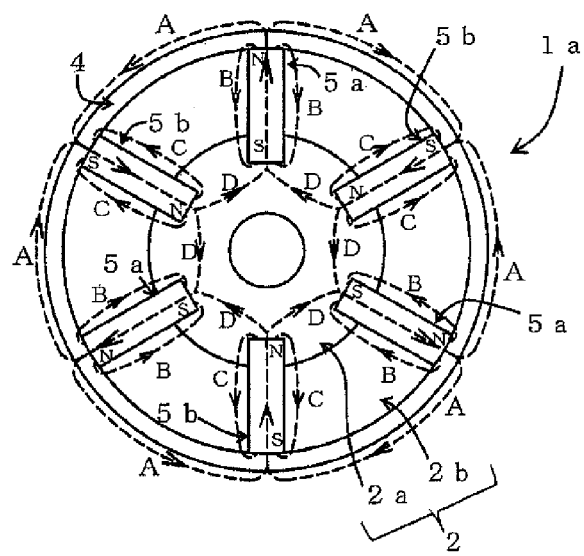
FIG. 3(a) is a plan view schematically showing a magnetic field generated when the permanent magnet embedded rotor of Example 1 is simple.
FIG. 3(b) is a plan view showing a state where the permanent magnet embedded rotor of Example 1 is disposed inside a stator.
Figure 3:
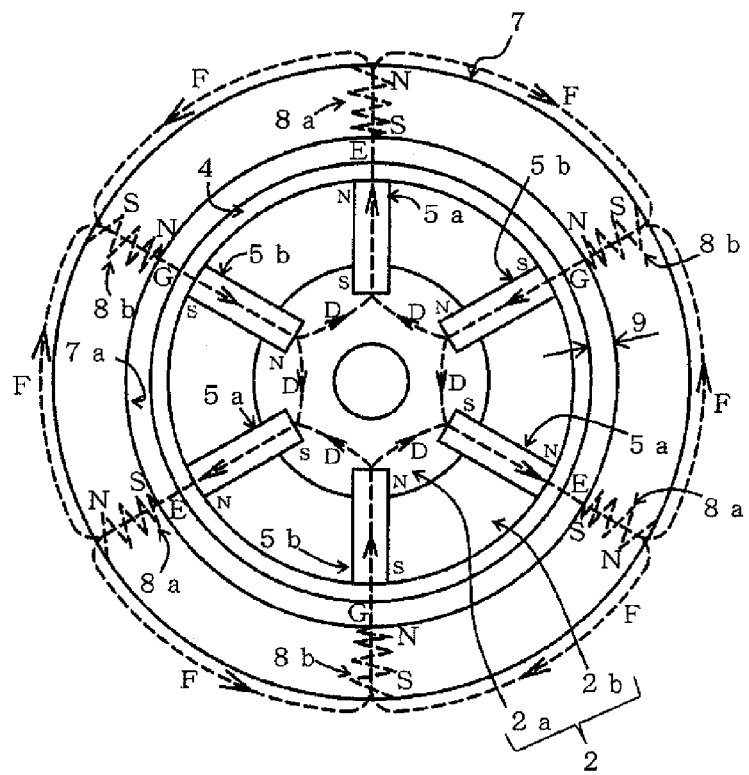
Figure 4:
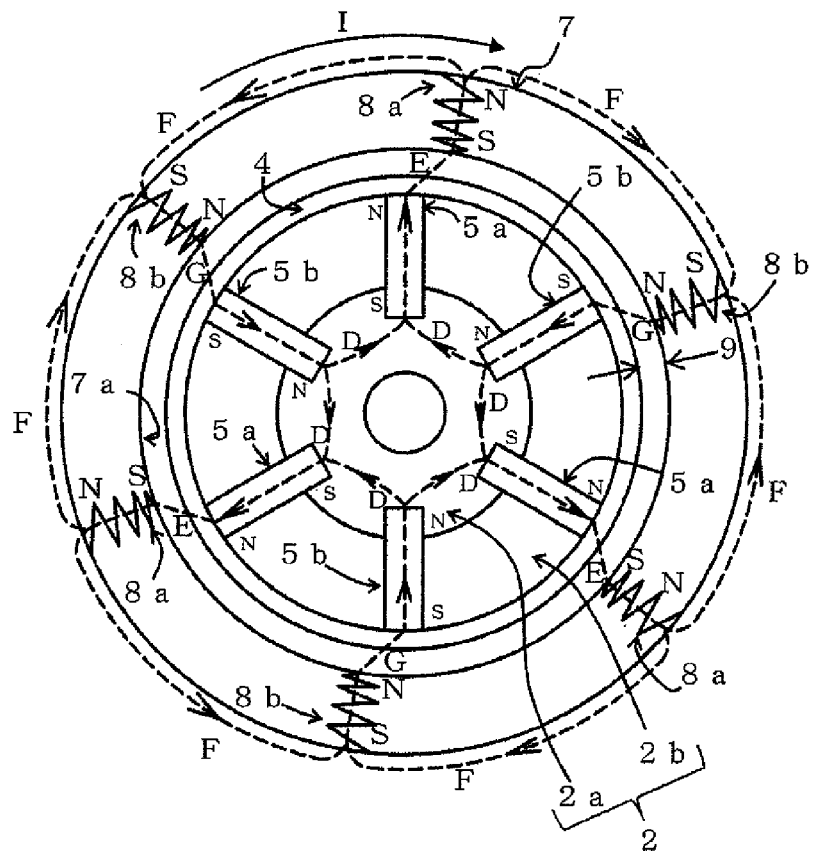
FIG. 4(a) is a plan view for describing operations of the permanent magnet embedded rotor of Example 1.
FIG. 4(b) is a partial enlarged view of FIG. 4(a).
Figure 4:
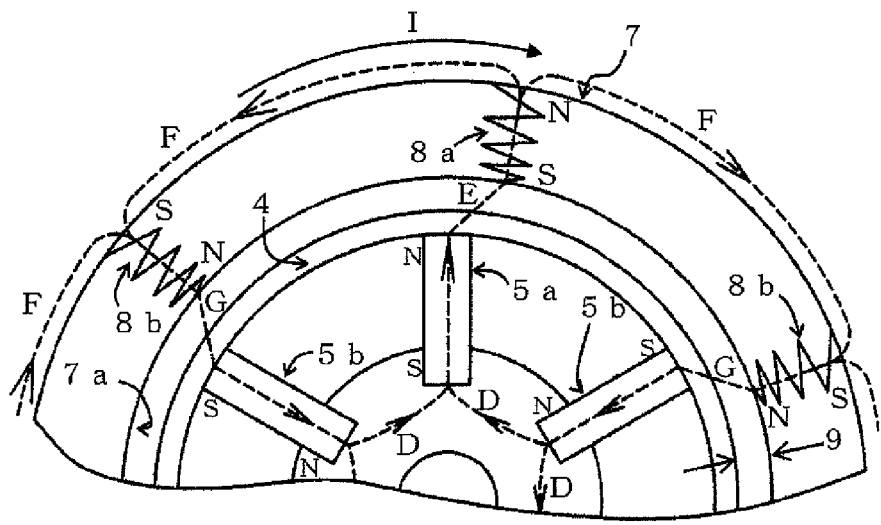

Next, operations of the rotor 1a are described with reference to FIG. 3 and FIG. 4.

FIG. 3(a) is a plan view schematically showing a magnetic field when the rotor 1a is simple, i.e., standalone, and FIG. 3(b) is a plan view showing a state where the rotor 1a is disposed inside the stator 7. FIG. 4(a) is a plan view for describing operations of the rotor 1a, and FIG. 4(b) is a partial enlarged view of FIG. 4(a), and both of these show the rotor 1a disposed inside the stator 7. In FIG. 3(b), FIG. 4(a), and FIG. 4(b), for describing magnetic paths formed by the magnetic poles of the coils 8 and the permanent magnets 5a and 5b inside the rotor 1a, for the sake of convenience, the coils 8 are denoted by two coils 8a and 8b. Further, the components shown in FIG. 1 and FIG. 2 are provided with the same reference symbols and description thereof is omitted.

As described above, in the rotor 1a, one ends of the permanent magnets 5a and 5b are fit in the insertion grooves 3 provided on the outer peripheral surface of the columnar body 2a made of a magnetic metal. Accordingly, the magnetic poles of the permanent magnets 5a and 5b are magnetically connected to each other via the columnar body 2a and between these, magnetic paths are easily formed. Therefore, when the rotor 1a is simple, as shown in FIG. 3(a), magnetic paths B through which the magnetic fluxes from the N poles of the permanent magnets 5a return to the S poles of the permanent magnets 5a via the spacer 2b, magnetic paths A through which the magnetic fluxes from the N poles of the permanent magnets 5a enter the S poles of the permanent magnets 5b, magnetic paths D through which the magnetic fluxes from the N poles of the permanent magnets 5b enter the S poles of the permanent magnets 5a via the columnar body 2a, and magnetic paths C through which the magnetic fluxes from the N poles of the permanent magnets 5b return to the S poles of the permanent magnets 5b via the spacer 2b, are formed. Between the permanent magnets 5a and 5b, the spacer 2b made of a nonmagnetic material is disposed, so that the magnetic paths B and the magnetic paths C are harder to form than the magnetic paths A and the magnetic paths D.

In the rotor 1a, when a magnetic field is produced by the coils 8a and 8b of the stator 7, as shown in FIG. 3(b), magnetic paths E through which magnetic fluxes from the N poles of the permanent magnets 5a enter the S pole of the coils 8a, magnetic paths F through which magnetic fluxes from the N poles of the coils 8a enter the S poles of the coils 8b, and magnetic paths G through which magnetic fluxes from the N poles of the coils 8b enter the S poles of the permanent magnets 5b, are formed. Then, when an alternating current is applied to the coils 8a and 8b to generate a rotating magnetic field, the rotor 1a rotates synchronously with the rotating magnetic field. In the rotor 1a, the cylindrical body 4 is made of a nonmagnetic metal with good electrical conductivity so as not to block the magnetic paths E and the magnetic paths G formed between the permanent magnets 5a and 5b and the coils 8a and 8b, and the spacer 2b made of a nonmagnetic material is disposed between the permanent magnets 5a and 5b to prevent the magnetic fluxes between the permanent magnets 5a and 5b and the coils 8a and 8b from weakening. Accordingly, a structure is established that is able to prevent the magnetic poles on the cylindrical body 4 side from being close to each other is obtained. Accordingly, the saliency of the rotor 1a increases, so that the adsorption power of the rotating magnetic field produced by the coils 8a and 8b increases.

As shown in FIG. 4(a), when a rotating magnetic field that rotates in the direction of the arrow I is produced by the stator 7, and the rotation of the rotor 1a is slower than the rotation speed of the rotating magnetic field, the cylindrical body 4 crosses the magnetic fluxes formed between the permanent magnets 5a and 5b and the coils 8a and 8b (magnetic paths E and magnetic paths G) in a direction opposite to the arrow I. As a result, according to Fleming's right-hand rule, an electromotive force is generated in a direction perpendicular to the paper surface, and an inductive current flows in the cylindrical body 4. Due to this inductive current, the cylindrical body 4 is subjected to a force based on Fleming's left-hand rule in the direction of the arrow I. As a result, the rotor 1a rotates in the direction of the arrow I. Thus, the rotor 1a is pulled by the rotating magnetic field produced by the coils 8a and 8b of the stator 7 and rotates even when it does not synchronize with the rotating magnetic field. Accordingly, the rotating state of the rotor 1a is maintained. In the rotor 1a, because not stainless steel but gold, silver, copper, or aluminum or an alloy of at least two kinds selected from these, etc., is used for the cylindrical body 4, an eddy current loss is minimized. For example, when the cylindrical body 4 is made of copper, it is preferable that the thickness is set to 1 mm to 5 mm although this depends on the magnetic flux density of the permanent magnets 5a and 5b and the material of the cylindrical body 4. In this case, magnetic saturation hardly occurs, so that heat generation can be significantly reduced. In the present example, the rotary shaft 6 is made of stainless steel, so that a magnetic path reaching the rotary shaft 6 through the columnar body 2a is hardly formed. Accordingly, flux leakage is reduced, so that strong magnetic paths E and G are formed between the permanent magnets 5a and 5b and the coils 8a and 8b. A nonmagnetic metal other than stainless steel may also be used for the rotary shaft 6, however, in consideration of strength and material cost, stainless steel is more preferable than gold, silver, copper, and aluminum, etc.

As described above, by using the rotor 1a in a synchronous motor, the eddy current loss can be reduced and heat generation can be reduced. In addition, the adsorption power of the rotating magnetic field increases and a strong rotation torque is generated, so that the clearance 9 between the stator 7 and the rotor 1a can be formed with sufficient size. Therefore, even when the rotor 1a thermally expands due to high-speed rotation or long driving and, as a result, the clearance 9 changes, a failure due to contact, etc., between the rotor 1a and the stator 7 hardly occurs. Further, synchronism loss can be prevented and the rotation efficiency can be improved. Even when the rotor 1a does not synchronize with the rotating magnetic field of the stator 7, a rotation torque can be generated and the rotating state of the rotor 1a can be maintained. In addition, the rotor 1a is structurally simple, so that it can be manufactured inexpensively.

Example 2

A permanent magnet embedded rotor of Example 2 is described with reference to FIG. 5 (corresponding to, particularly, claim 5).

Figure 5:
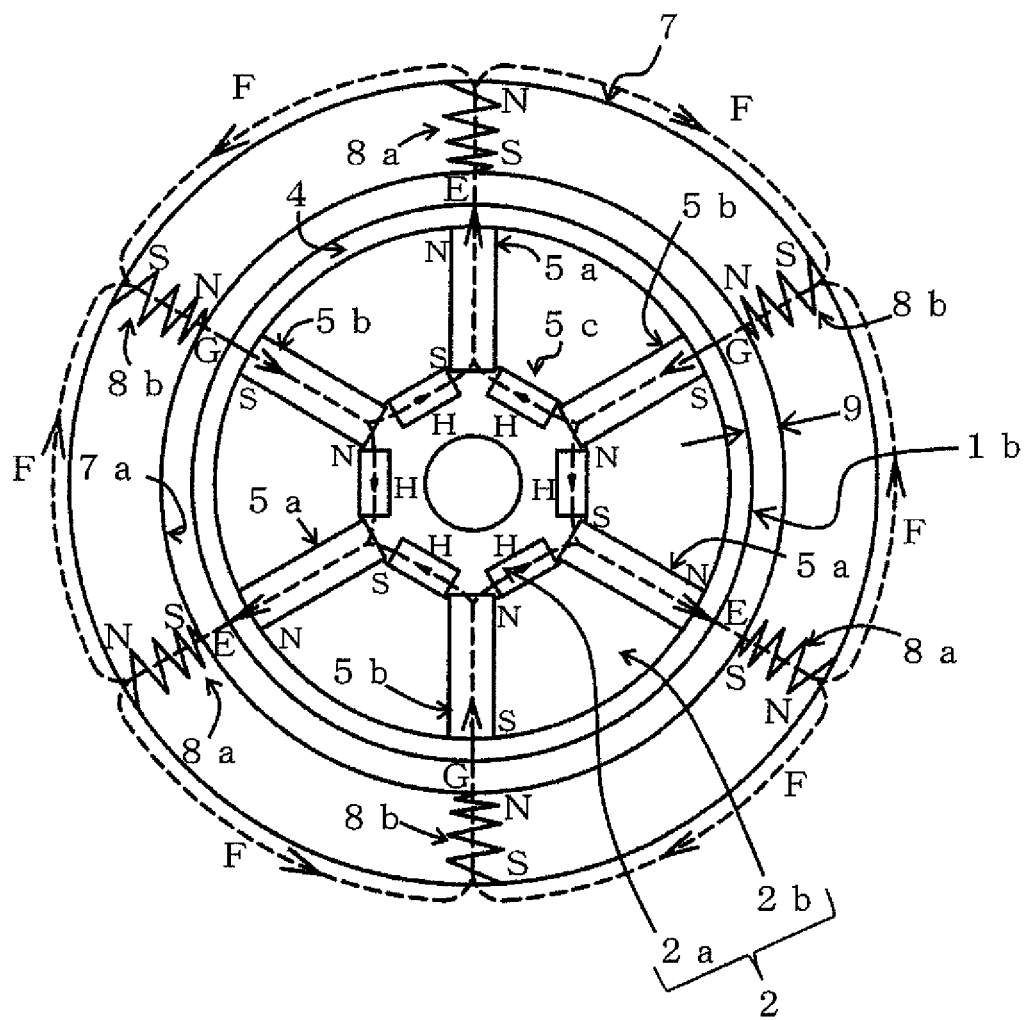
FIG. 5 is a plan view of Example 2 of the permanent magnet embedded rotor according to an embodiment of the present invention.

FIG. 5 is a plan view of a permanent magnet embedded rotor of Example 2. The components shown in FIG. 1 to FIG. 4 are provided with the same reference symbols and description thereof is omitted.

As shown in FIG. 5, the permanent magnet embedded rotor of the present example (hereinafter, referred to as rotor 1b) is structured so that, in the rotor 1a of Example 1, permanent magnets 5c each of which is rectangular in a plan view and has magnetic poles formed on both ends are embedded in the outer peripheral surface of the columnar body 2 so that the magnetic poles reverse to the magnetic poles on the sides in contact with the columnar body 2 of the permanent magnets 5a and 5b are made close to these magnetic poles of the permanent magnets, respectively. In the present example, the permanent magnets 5c are embedded in the outer peripheral surface of the columnar body 2, however, they are not limited to this structure, and for example, it is also possible that the permanent magnets 5c are disposed in contact with the outer peripheral surface of the columnar body 2 4.

In the rotor 1b, when a magnetic field is produced by the coils 8a and 8b of the stator 7, magnetic paths H through which magnetic fluxes from the N poles of the permanent magnets 5b enter the S poles of the permanent magnets 5a after passing through the permanent magnets 5c are formed. Specifically, by the permanent magnets 5c, magnetic paths H stronger than the magnetic paths D in Example 1 are formed between the magnetic poles of the permanent magnets 5a and 5b on the columnar body 2 side. Therefore, by using the rotor 1b in a synchronous motor, while the rotor is compact, a strong rotation torque can be generated with higher efficiency than in the case of Example 1.

INDUSTRIAL APPLICABILITY

The present invention is applicable to rotors of synchronous rotary electromotors such as synchronous motors and synchronous generators, etc.

DESCRIPTION OF REFERENCE SYMBOLS

1a Rotor
1b Rotor
2 Rotor core
2a Columnar body
2b Spacer
3 Insertion groove
4 Cylindrical body
5a Permanent magnet
5b Permanent magnet
5c Permanent magnet
6 Rotary shaft
7 Stator
7a Inner peripheral surface
8 Coil
8a Coil
8b Coil
9 Clearance
A Magnetic path
B Magnetic path
C Magnetic path
D Magnetic path
E Magnetic path
F Magnetic path
G Magnetic path
H Magnetic path
I Arrow

What is claimed is:

1. A permanent magnet embedded rotor to be used in a synchronous rotary electromotor, comprising:
   a rotor core including a columnar body made of a magnetic metal and a spacer made of a nonmagnetic material;
   a cylindrical body that is externally provided around the rotor core and made of a nonmagnetic metal with good electrical conductivity;
   permanent magnets embedded in the rotor core so that one ends of the magnetic poles come into contact with the inner peripheral surface of the cylindrical body and the other ends of the magnetic poles come into contact with the columnar body; and
   a rotary shaft fit into a rotation center of the rotor core,
   wherein the permanent magnets are disposed so that their N poles and S poles alternately come into contact with the inner peripheral surface as viewed in the circumferential direction of the cylindrical body, and each being formed in a substantially rectangular shape in a plan view which is orthogonal to a direction of the rotary shaft while its outer peripheral side is slightly curved, and the cylindrical body is made of gold, silver, copper, or aluminum, or an alloy of at least two kinds of material selected among these, and
   wherein the rotor core comprises an even number of insertion grooves each being formed from an outer peripheral surface of the rotor core toward the rotation center in the plan view; wherein the insertion groove includes two parallel planes for insertion of the permanent magnet, and wherein a longitudinal direction of the permanent magnet matches with a radial direction of the rotor core.

* * * * *